United States Patent [19]

Nakai et al.

[11] Patent Number: 4,831,512
[45] Date of Patent: May 16, 1989

[54] SYSTEM AND METHOD OF MESSAGE COMMUNICATION CAPABLE OF CHECKING CONSISTENCY AMONG DATA

[75] Inventors: Kozo Nakai, Katsuta; Shinji Hori, Mito; Kinji Mori, Yokohama; Katsumi Kawano, Fuchu; Hirokazu Kasashima; Setsuo Kawakami, both of Hitachi, all of Japan

[73] Assignee: Hitachi, Ltd., Tokyo, Japan

[21] Appl. No.: 56,946

[22] Filed: Jun. 3, 1987

[30] Foreign Application Priority Data

Jun. 4, 1986 [JP] Japan ................................ 61-127967

[51] Int. Cl.⁴ ............................................. G06F 15/16
[52] U.S. Cl. ................................................... 364/200
[58] Field of Search ......................... 364/200, 300, 900

[56] References Cited

U.S. PATENT DOCUMENTS

| 4,584,643 | 4/1986 | Halpern et al. | 364/200 |
| 4,653,048 | 3/1987 | Anderson et al. | 364/200 X |
| 4,718,002 | 1/1988 | Carr | 364/200 |

FOREIGN PATENT DOCUMENTS 6158050  3/1986  Japan .

Primary Examiner—Raulfe B. Zache
Attorney, Agent, or Firm—Antonelli, Terry & Wands

[57] ABSTRACT

A message processing system has a common transmission medium and a plurality of processors or processing equipments connected to the common transmission medium. The processors process messages independenty from each other. Each processor adds information relating to an order of messages to a message resulting from processing by the processor and sends to resulting message to the common transmission medium. In accordance with the invention, a plurality of messages are readily identified.

20 Claims, 6 Drawing Sheets

SYSTEM AND METHOD OF MESSAGE COMMUNICATION CAPABLE OF CHECKING CONSISTENCY AMONG DATA

BACKGROUND OF THE INVENTION

The present invention relates to a transmission system of a message (for example, process control data) between a plurality of processors or processing equipments (for example, computers or input/output devices) coupled to a common transmission line. Such a transmission system is disclosed in U.S. Pat. No. 4,366,479 issued to Mori et al, on Dec. 28, 1982. The present invention relates to an improvement of consistency check suitable to check redundant messages in the processors of such transmission system and select one among those messages.

In a distributed or dispersed processing method for processing a series of data by a plurality of processors connected to a common transmission line, if there are a plurality of processors which execute the same step, results of processing by those processors are sent to the transmission line as they are, and the receiving processor selects the messages relating to the same step from the received messages and they are determined by a majority decision in the receiving processor (JP-A-61-58050 laid open on Mar. 25, 1986).

In this method, messages having the same content code (code representing the content of the message) are collected for a certain period, the number of messages is counted, and they are determined by the majority decision.

In this method, the messages which belong to the same step of processing are identified only by the content codes. Thus, if a processor which executes the same step of processing is started by a different trigger (by interruption by an external unit) in a short period shorter than the message collection period, an output message by the different trigger cannot be identified.

SUMMARY OF THE INVENTION

It is an object of the present invention to provide a system which resolves the problem encountered in the prior art system and can readily identify a desired message.

It is another object of the present invention to provide a system which can readily eliminate redundant or superfluous messages.

Other objects and features of the present invention will be apparent from the following description of the invention.

In accordance with the present invention, the processors or processing equipments connected to the transmission line are provided respectively with (1) means for generating a message by adding data called a time stamp for indicating time information such as data take-in time from an external input device and sending the message to the transmission line, and (2) means for passing the content of the time stamp to a message to be sent to the transmission line as a result of processing in accordance with the content of message taken into from the transmission line.

By the provision of means (1) and (2), a different time stamp is set for each external input data (trigger). Thus, by examining the time stamp, the message by the different trigger can be identified.

DESCRIPTION OF THE PREFERRED EMBODIMENTS

One embodiment of the present invention is explained with reference to FIGS. 1 to 4. A system configuration to which the present invention is applied is first explained with reference to FIGS. 2 to 4. In the present embodiment, a loop transmission line is used as a common transmission line 1 to connect the processors, although other conventional networks may be used to attain the same processing.

Figure 2:
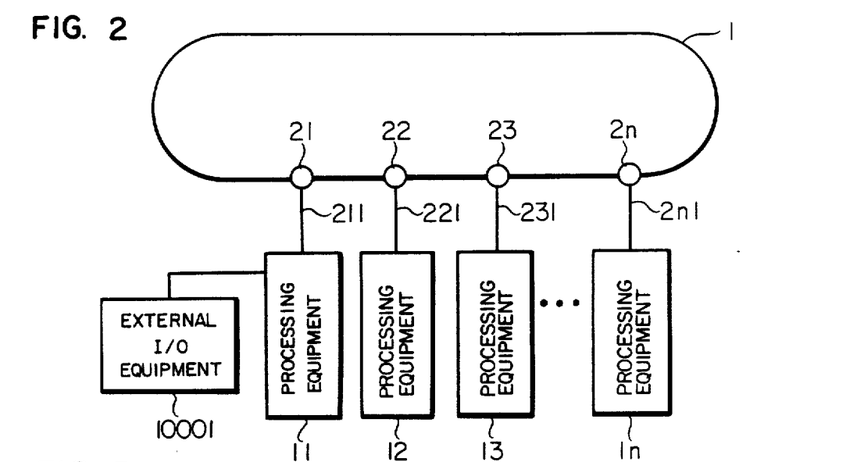
FIG. 2 shows an overall configuration of a data processing system to which the present invention is applied.

In FIG. 2, numerals 11-1n denote processors or processing equipments which store application programs therein and execute the programs. Numeral 21-2n denote network control processors (NCP) for controlling data transmission over the transmission line. The NCP's 21-2n and the processors 11-1n are connected through bilateral transmission media 211-2nl, respectively. Data processed by the processors 11-1n are sent as messages to the transmission line 1 through the respective NCP's 21-2n. The NCP determines if the message flowing over the transmission line 1 is necessary for the processor connected thereto, and if it is necessary, it sends the message to the processor connected thereto. When all messages necessary to execute the application programs stored in the internal memories of the processors 11-1n are ready, the processors 11-1n start the application program. The messages are processed by the started programs, and the process results are outputted as messages. In the present embodiment, an external input/output equipment 10001 for inputting and outputting data between the processor and an external equipment.

Figure 3:
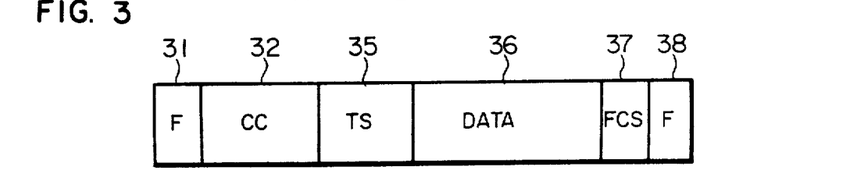
FIG. 3 shows a format of a message prepared by the present invention.

FIG. 3 shows a format of the message transferred through the transmission line. CC 32 denotes a content code to indicate a data content or function. Based on the content code, each NCP (21-2n) determines whether the data transmitted through the transmission line is necessary for the processors connected thereto. The decision by the NCP is not necessarily based on the content code but it may be based on the address of the processor or NCP, other decision code or other transmission protocol. Data 36 represents a process result of the application program, FCS 37 denotes error detection data, numerals 31 and 38 denote flags (F) for indicating the beginning and end of the message, and TS 35 denotes information (called a time stamp) relating to the order of messages which is established in accordance with the present invention. When the processor processes an input from the external equipment and sends a process result message to the transmission line, the time stamp is added to the message. The time stamp includes one or both of the order of input data from the external equipment and a time interval between the time-serial input data. The time interval is set by a timer provided in each processor. In accordance with the present invention, there is no need to match the times of the timers of the respective processors but each processor may independently issue the time stamp. (The time stamp may also include a time common to the overall system. In this case, order information and time interval information are always added to each message.)

Figure 4:
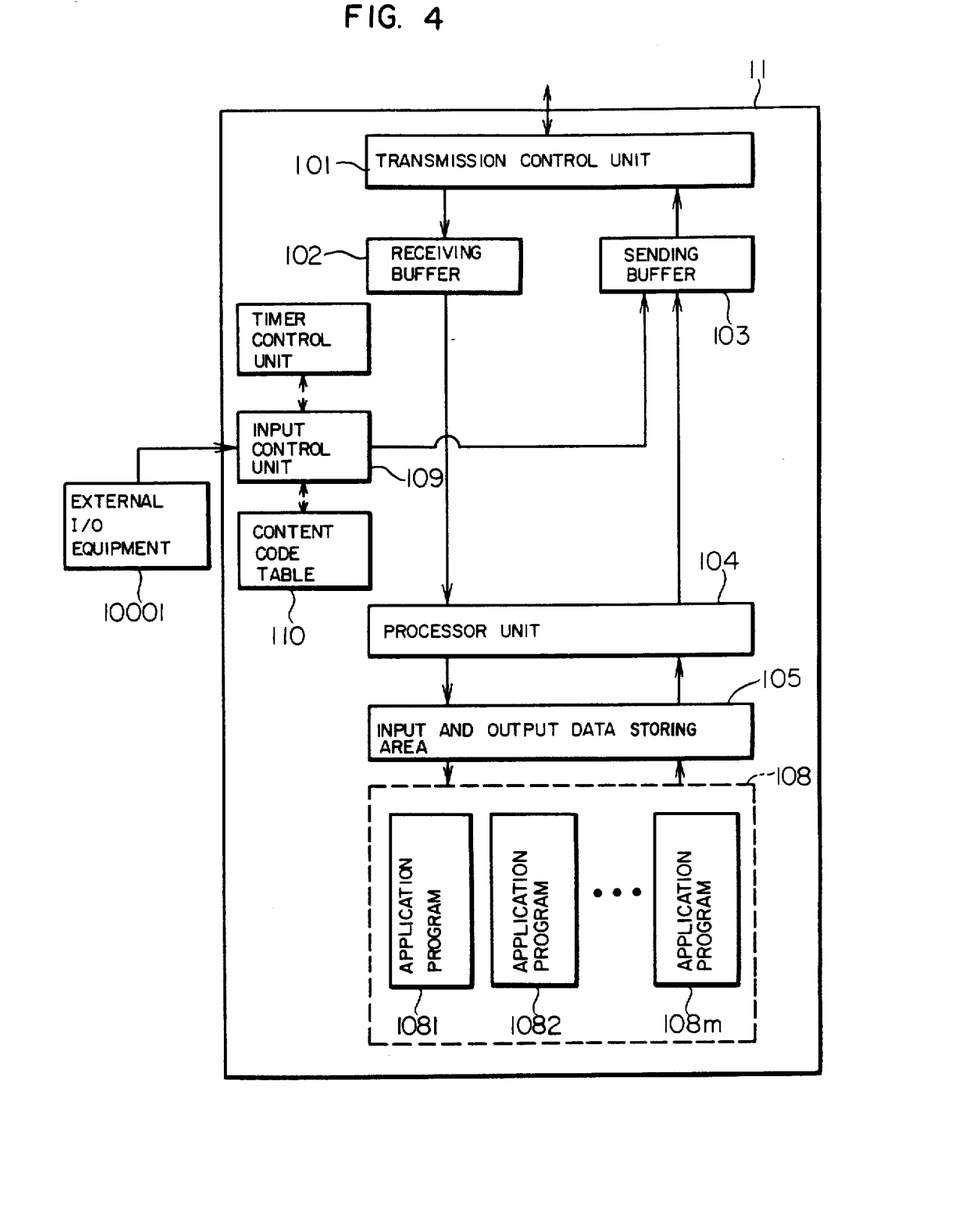
FIG. 4 shows a detail of a processor or a processing equipment.

FIG. 4 shows a block diagram of the processor 11 shown in FIG. 2. Other processors 12-1n have the same configuration. A transmission control unit 101 transfers data between the NCP 21 and the processor 11. The unit 101 stores the message received from the NCP 21 to a receiving buffer 102, and sends the message in a sending buffer 103 to the NCP 21. When the message sent to the NCP 21 is necessary for the execution of the application program of its own processor, the unit 101 may store the message in the receiving buffer 102. (This function may be attained by sending the message necessary for its own processor to the transmission line and then receiving it from the transmission line.) A processor unit 104 controls the executions of the application programs 1081-108m. An external input control unit 109 takes in the input from the external equipment 10001. An external input CC table 110 stores the content code of the external input data. An input/output data store area 105 stores input/output messages for each application program.

Figure 5:
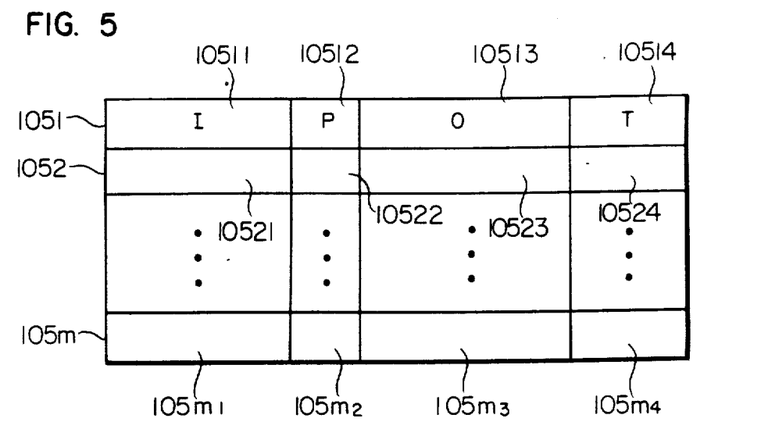
FIG. 5 show an input/output data store table.

FIG. 5 shows a detailed content of the input/output data store area. A first line 1051 of the area stores the I/O messages for the application program 1081. An area 10511 stores the input message and an area 10513 stores the output message. A start program area 10512 indicates the program to be started by the input message stored in the area 10511 (that is, the application program 1081). A time stamp store area 10514 stores the time stamps of a preset number of past input messages and the corresponding input messages. It always stores the time stamps of the latest preset number of past input messages. A second line 1052 stores the I/O messages of the application program 1082. Similarly, an I/O message area is provided for each of other application programs.

The consistency processing of the multiple input messages of the present invention will now be explained with reference to FIGS. 6 to 10.

Figure 6:
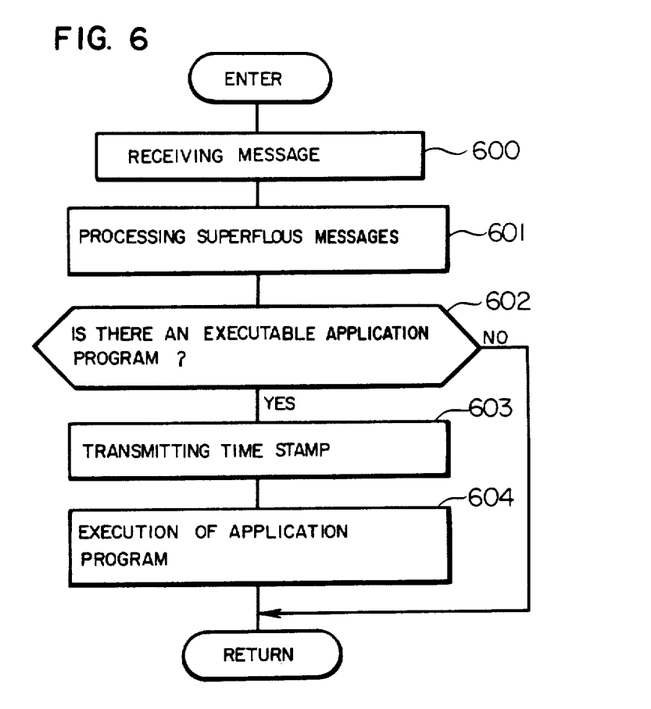
FIGS. 6 to 10 show flow charts for explaining flows of message processing.

FIG. 6 shows an overall process flow when the message is applied to the processor unit 104 shown in FIG. 4.

When the processor receives the message from the receiving buffer 102, it carries out the consistency processing of the present invention (601). Then, whether an executable program is present or not, that is, whether all input messages necessary for the execution of the program are stored in the I/O message store area 105 or not is checked (602). If there is no executable program, the process is terminated. If there is an executable program, the time stamp TS in the input data store area for that program is stored into the time stamp area in the output data store area for that program (603).

When the program is to be started by a plurality of input messages, all time stamps set in the time stamp areas of the respective input messages are stored into the time stamp areas in the respective data store areas. However, if the total number of the time stamps of all input messages exceeds the capacity of the time stamp areas, they are processed in accordance with a predetermined criterion such as eliminating those having smaller time stamp contents or passing only time stamps of selected messages. In a special case where there is one time stamp area and the input message to be passed is specified, only the time stamp for the input from the specific external equipment is passed. After the step 603, the executable program is started (604). After the execution, the input data store area is reset.

The started application program processes the input messages and stores the process result into the output data store area (Data). When data has been set in the Data area of the output data store area, the processor transfers the contents of the area CC, TS and Data to the corresponding areas in the sending buffer 103 (The transfer of the data to those areas is detected by providing flags in the areas so that data are set and transferred to buffers in accordance with the flags, or by clearing the areas whenever the data are transferred to the buffers and checking the contents of the area.)

Figure 7:
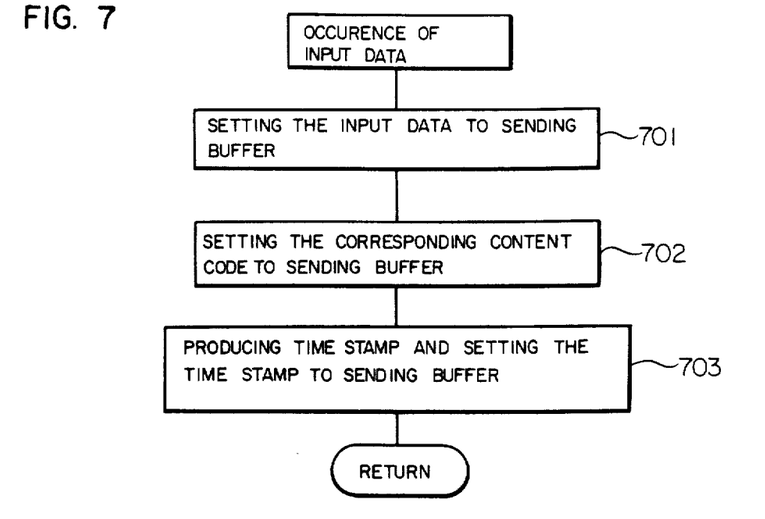

FIG. 7 shows a process flow of the external input control unit, when an external input occurs, the external input control unit 109 determines the content code of the input data based on the external input CC table 110, sets to the sending buffer the content of the external input data and the content code determined based on the external input CC table (701, 702). Then, the time stamp is set to the time stamp area in the sending buffer by the timer provided in its processor (703).

The time stamp may be set in a predetermined manner depending on the characteristic of the system, such as by a decimal code, for example, 19860304115157 or by a binary code with a certain time point in a day being zero.

By the process shown in FIG. 6, the time stamps added to the messages are sequentially transmitted by the processors which process the messages. By the process shown in FIG. 7, the addition of the time stamps to the messages is done when the input data from the external equipment is processed, and they are sent to the transmission line as the messages to be processed by the process of FIG. 6.

Four examples (1)–(4) of the step 601 of the process of FIG. 6 carried out by the processor are described below.

(1) Prioritied processing of first received messages.

Figure 8:
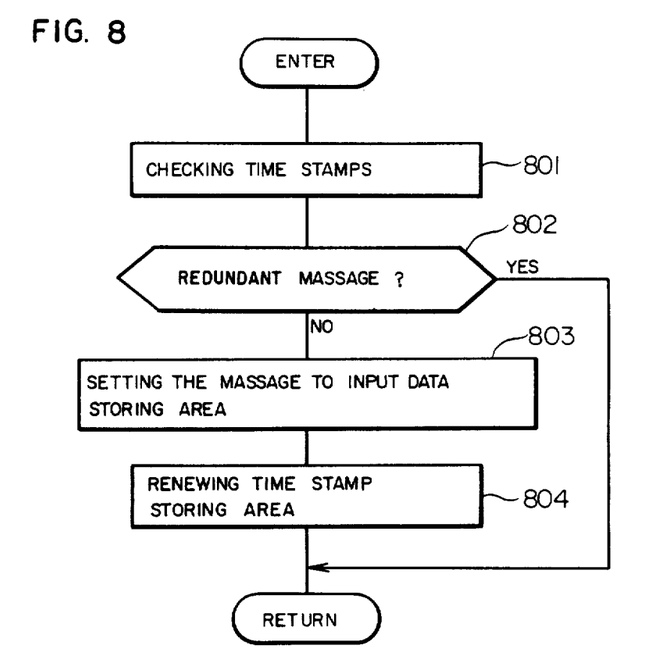

FIG. 8 shows a process flow for the prioritied processing of the first received messages in the step 601 of the process shown in FIG. 6. Whether the time stamp in the message fetched from the receiving buffer is equal to the time stamp of the past input message having the same content code as the current input message or not is checked (801). Specifically, the line of the I/O data store area which stores the same content code as the current input message in the input data store area CC is searched, and whether the same time stamp as that of the current input message is stored in the time stamp area of the searched line or not is checked. If there is the same time stamp, the current input message is a duplicate of the past input message and hence it is redundant. Accordingly, the message fetched from the receiving buffer is not set in the input data store area and the process is terminated (802). Namely, it is eliminated because it is the duplicate of the past input message. On the other hand if there is no same time stamp, the current input message is the first received message, and the time stamp TS and the Data of the input message are set in the input data store area in which the same content code as that of the input message is set. Then, the time stamp of the current input message is added to the time stamp store area of the I/O data store area in which the message is stored. If the number of time stamps exceeds the preset number, the oldest time stamp is erased (804). The oldest time stamp means the earliest one in the order of data occurrence described in the time stamp.

In this manner, when each processor receives the message, it is discarded if the same message (that is, CC and time stamp are same) as the current message is included in the past received messages. As a result, if there are redundant messages in the system, only those messages which are first received by the processor are inputs to the application program.

Figure 1:
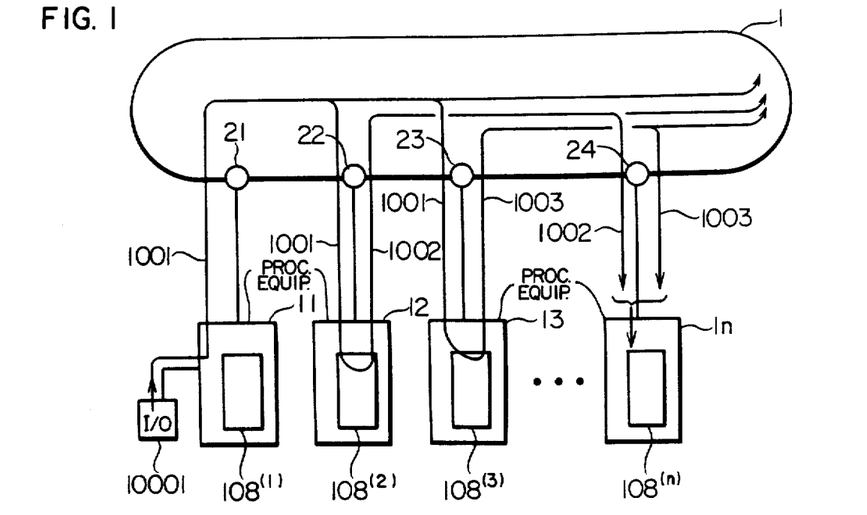
FIG. 1 shows an overall processing system and a flow of messages in accordance with one embodiment of the present invention.

A flow of message signals in the system for the process (1) is explained with reference to FIG. 1. Let us assume that the processors 11-1n store the application programs 108$^{(1)}$, 108$^{(2)}$, ..., 108$^{(n)}$ therein and the programs 108$^{(2)}$ and 108$^{(3)}$ in the processors 12 and 13 are identical. When the processor 11 reads in the data from the external input equipment 10001, it prepares a message 1001 by adding a content code CC and a time stamp TS to the data from the external input equipment and sends the message to the transmission line 1.

The processor 12 reads in the message 1001 and starts the application program 108$^{(2)}$ stored therein. The application program 108$^{(2)}$ executes the process by using the message 1001 and produces Data 2 and CC$_2$. The processor 12 adds the time stamp TS$_1$ in the message 1001 to the CC$_2$ and Data 2 produced by the program 108$^{(2)}$ to prepare a message 1002, which is sent to the transmission line 2. The processor 13 also reads in the message 1001, starts the application program 108$^{(3)}$ stored therein, prepares a result message 1003 and sends it to the transmission line 1. Since the application programs 108$^{(2)}$ and 108$^{(3)}$ are identical, the messages 1002 and 1003 have the identical CC2, Data 2 and TS 1.

Let us assume that the message 1003 first arrives at the processor 1n. The processor 1n reads in the message 1003 and starts the application program 108$^{(n)}$ stored therein. If the message 1002 then arrives at the processor 1n, the processor 1n reads in the message 1002, but it determines that it is same as the message 1003 based on CC$_2$ and TS 1 and discards the message 1002. If the message 1002 arrives earlier than the message 1003, the message 1003 is similarly discarded.

(2) Prioritied processing of latest message

In the steps 801 and 802 of the process (1), only the time stamps of the messages processed by the application program are stored, and if a message having an older time stamp than the stored time stamps is received, it is discarded.

In this process, the time-serial order of the messages to be processed by the application program is assured.

(3) Correction processing of multiple messages

Figure 9:
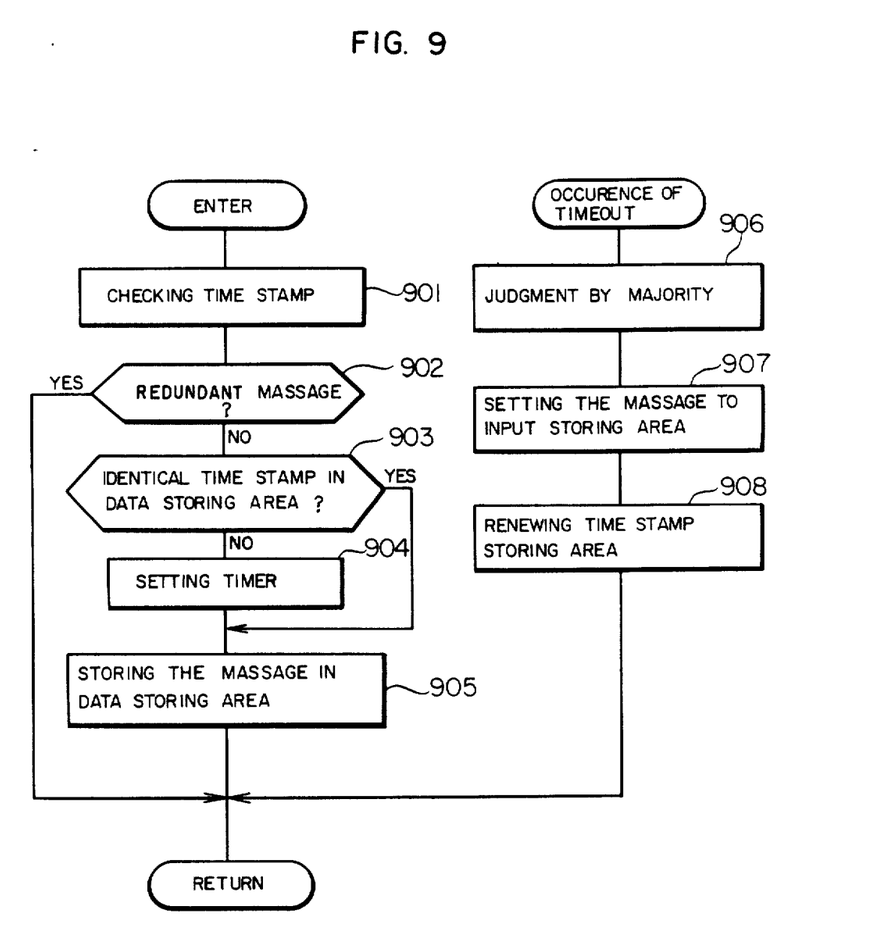

In the processes (1) and (2), only one of multiple messages is selected on the first arrive or latest arrive basis. Alternatively, a redundant message store area may be provided in each processor and a majority logic may be incorporated in the multiple message processing step of the step 601 of FIG. 6 so that the messages are collected and the message to be used is selected therefrom by the majority logic. A process flow therefor is shown in FIG. 9. The processor checks the time stamp of the message read from the receiving buffer (901). If it is determined to be a redundant message, the process is terminated. If it is not redundant message, whether the time stamp of the message is same as the time stamp of the message stored in the data store area or not is checked (903).

If it is same, the message is stored in the data store area (905). If it is not same, the timer is set (904) and then the message is stored in the data store area (905). (The timer is monitored for each redundant message). When the timer set in the step 904 times out, majority logic is carried out for the corresponding redundant messages in the redundant message store area (906), and the selected message is set into the input data store area (907). An event number in the message is set into an event number store area (908).

In the present process, the majority logic is performed when the time-out occurs. Alternatively, it may be performed when a predetermined number of redundant messages have been collected.

(4) Cyclic message error check

When the time interval of the addition of the time stamps to the messages is known, an error of the processor which has added the time stamp may be detected based on the time stamps of the messages received by the processors. For example, when the time stamp is added to an input data from an external equipment such as a sensor which periodically generates data to prepare a message to be sent to the transmission line, the error in the processor which includes the external equipment as the signal source is detected based on a deviation of the time interval.

Figure 10:
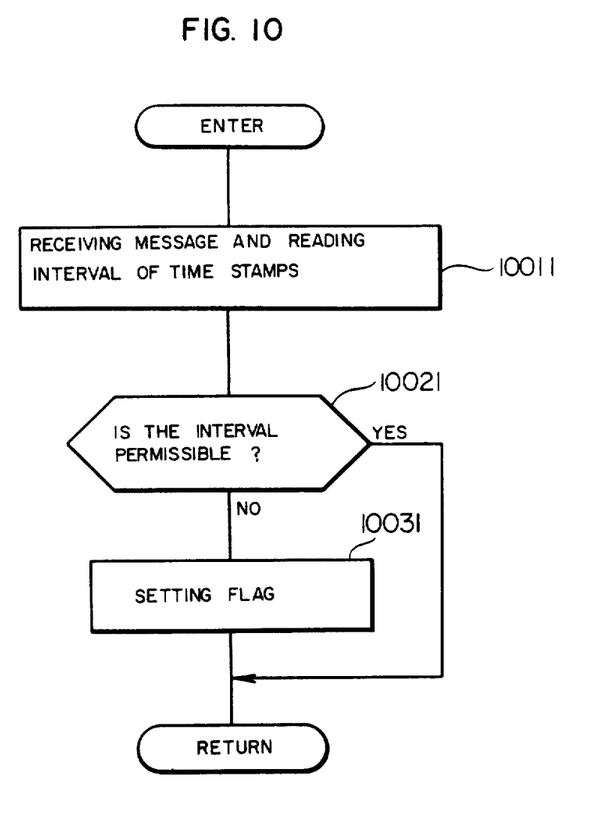

This process is carried out in the multiple message process step 601 of FIG. 6, and shown in FIG. 10.

The data occurrence interval information included in the time stamp of the input message is read (10011). Whether the time interval information is within a predetermined interval or not is checked (10021). The predetermined interval means the data occurrence interval of the external equipment which is the data source. This interval is ① previously set as a constant, or ② calculated from the time stamps of the messages so far received. In case of ②, (i) the time stamp of the immediately preceding message is used, or (ii) the time stamps of n preceding messages are used. In any case, a necessary number of messages are stored in the message store area. In case of (ii), the time stamps of only those of n messages which have not been determined as error are used and an average value thereof is used as the predetermined time interval. The check in the step 10021 uses this predetermined time interval, or if necessary, an allowable range is set by taking an error in the data source into account, and whether the time interval of the time stamp of the received message is within the allowable range or not is checked.

If it is not within the allowable range, the processor determines that the processor which includes the data source was in error and set an error flag in the received message (10031).

We claim:

1. A message processing system comprising a common transmission medium and a plurality of processing equipments connected to said common transmission medium for processing messages independently from each other;

said processing equipments each including means for adding information relating to an order of messages to a message including data resulting from processing by a processing equipment and for sending a resultant message to said common transmission medium.

2. A message processing system according to claim 1, wherein said processing equipments include means responsive to receipt of a message having information relating to an order of massages for maintaining information relating to an order of messages and means for adding information relating to an order of messages to a message resulting from processing by said processing equipments.

3. A message processing system according to claim 2, wherein said processing equipments are responsive to receipt of a plurality of messages for processing the received messages and for adding information relating to an order of the messages included in respective received messages to said messages.

4. A message processing system according to claim 1, wherein said information relating to an order of messages comprises information indicating an order in which messages are processed by addition of said information thereto.

5. A message processing system according to claim 1, wherein said information relating to an order of messages includes information indicating an order in which messages are processed by addition of said information thereto and a time interval of the addition.

6. A message processing system according to claim 1, wherein said processing equipments include means responsive to a plurality of messages for one process read form said transmission medium for determining coincidence between messages using information in said messages relating to an order of messages.

7. A message processing system according to claim 1, wherein said processing equipments include means for storing a plurality of messages for one process read from said transmission medium into a memory of processing equipment, means for determining coincidence between messages using information relating to an order of messages included in said messages, and means for comparing contents of coincident messages to check for validity of a message.

8. A message processing system according to claim 7, wherein validity of a message is determined by majority logic.

9. A message processing system according to claim 1, wherein said processing equipments include means for determining whether data has occurred at a predetermined time interval for a plurality of messages for one process read from said transmission medium by using information including the information relating to the order of messages included in respective messages and a time interval of application of said information.

10. A message processing system according to claim 5, wherein said processing equipments include means for determining that a plurality of messages are for one process by utilizing content codes indicating contents of said messages.

11. A message processing method in a system having a common transmission medium and a plurality of processing equipments connected to said common transmission medium, comprising the steps of:
receiving messages read from said common transmission medium in said processing equipments; and
processing said messages independently from each other and in a predetermined manner on the basis of data relating to time included in said messages.

12. A message processing method in a system having a common transmission medium and a plurality of processing equipments connected to said common transmission medium, comprising the steps of:
reading messages in said processing equipments from said transmission medium; and
processing messages independently from each other and in a predetermined a manner, and in message processing by one processing equipment, data relating to time added by anther processing equipment to a message read by said another processing equipment from said common transmission medium is reserved and sent to said common transmission medium.

13. A message processing method in a system having a common transmission medium and a plurality of processing equipments connected to said common transmission medium, comprising the steps of:
reading messages in said processing equipments from said common transmission medium; and
processing said messages independently from each other and in a predetermined manner; and
wherein processing a message in one processing equipment is effected by reserving a portion of first data relating to time added by another processing equipment to the message read from said common transmission line by said another processing equipment and adding second data relating to time different from the first data so that a resulting message is formed and sent to said common transmission medium.

14. A message processing method in a system having a common transmission medium and a plurality of processing equipments connected to said common transmission medium, comprising the steps of:
reading messages in processing equipment from said common transmission medium; and
processing said messages independently from each other and in a predetermined manner, which messages exchanged between said common transmission medium and said processing equipments have data relating to time added thereto;
wherein processing a message in one processing equipment is effected by checking coincidence of content codes indicating contents of messages and data relating to time for a plurality of sequentially read messages;
and when there is coincidence, determining that the messages are redundant.

15. A message processing method according to claim 14, wherein when messages are redundant, a first read message is processed.

16. A message processing method according to claim 14, wherein when messages are redundant, a message selected by a majority logic based on a data relating to time is processed.

17. A message processing method in system having a common transmission medium and a plurality of processing equipments connected to said common transmission medium, comprising the steps of reading messages in said processing equipments from said common transmission medium; and
processing said messages independently from each other and in a predetermined manner, which messages exchanged between said common transmission medium and said processing equipments have data relating to time added thereto;
wherein message processing is effected in one processing equipment by storing a plurality of sequentially read messages in a memory in said one processing equipment and checking validity of messages based on the stored messages.

18. A message processing method according to claim 17, wherein when messages are valid, an application program stored in a memory of a processing equipment is started by said messages.

19. A message processing method according to claim 17, wherein a validity check is performed after a processor has read messages from said common transmission medium.

20. A message processing method according to claim 17, wherein a result of a validity check is indicated as a portion of a message.

* * * * *